Jan. 10, 1950 R. TURNER ET AL 2,494,271
ROTARY WEED CUTTER
Filed Dec. 10, 1948 2 Sheets-Sheet 1

INVENTORS
RALPH TURNER,
LLOYD HOWELL,
BY
L. B. James
ATTORNEY

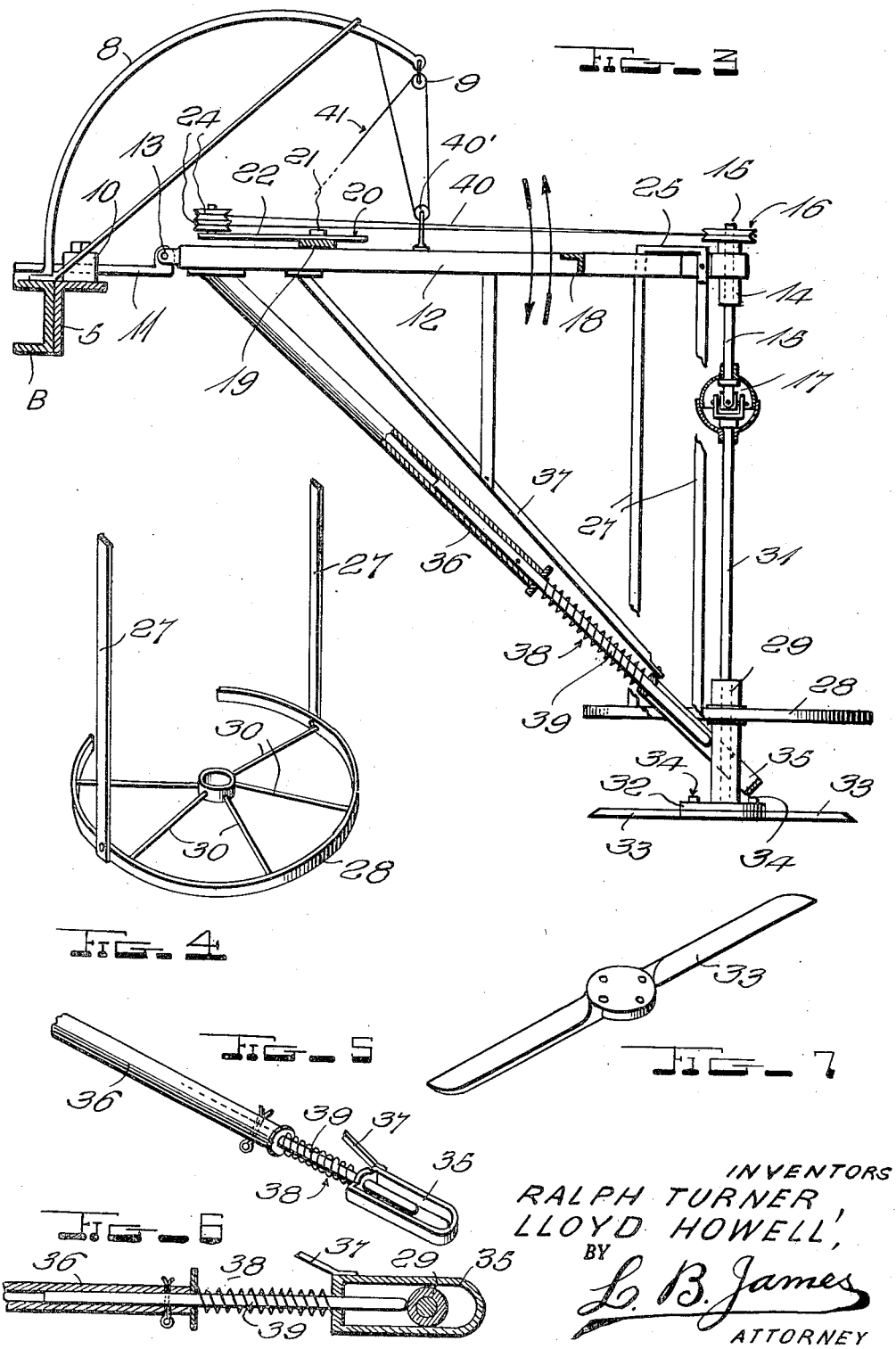

Patented Jan. 10, 1950

2,494,271

UNITED STATES PATENT OFFICE 2,494,271

ROTARY WEED CUTTER

Ralph Turner and Lloyd Howell, Cornell, Ill.

Application December 10, 1948, Serial No. 64,662

4 Claims. (Cl. 56—25.4)

This invention relates to rotary weed cutters and more particularly improvements in the weed cutter set forth in our pending application Serial No. 13,298 now matured into Patent No. 2,481,798, dated September 13, 1949.

One of the objects of this invention resides in the provision of a rotary weed cutter adapted to operate close to fence posts, trees and the like with the possibility of the rotating cutting blade entirely eliminated.

Another object of this invention resides in the provision of a rotary weed cutter adapted to be mounted on a tractor and operated by its take-off with the rotating cutting blade thereof protected against damage when working in close proximity to stationary objects or beneath fences having their lower ends disposed above the ground.

A further object of this invention resides in the provision of a rotary weed cutter mounted on a tractor and operated by the take-off thereof so the cutting blade will shift from its adjusted working position when encountering obstructions and automatically return to normal position when passing by the obstructions.

A still further object of this invention resides in the provision of a rotary weed cutter attached to a tractor with its cutting blade manually adjusted from the operator's seat and yieldingly retained in adjusted position.

One of the salient features of this invention resides in the combination of a rotary weed cutting blade mounted on a tractor and operated by the power plant thereof so it can be adjusted in various directions and means yieldingly retaining it in adjusted positions so it will be deflected from engagement with stationary objects and thereafter automatically return to its normal adjusted position.

Among the many objects of this invention is the particular construction of the cutting blade guard.

Aside from the aforesaid objects, this invention resides in the particular construction of the yielding control means of the cutting blade.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to such departures therefrom as come within the scope of the claims.

In the accompanying drawings forming a part of this application:

Fig. 3 is a front view of the weed cutter secured to a tractor.

Fig. 4 is a perspective view of the cutting blade guard.

Fig. 5 is a perspective view of the yielding control arm of the cutting blade.

Fig. 6 is a longitudinal sectional view taken through the yielding control arm and lower bearing of the cutting blade.

Fig. 7 is a plan view of the cutting blade.

Figure 1:
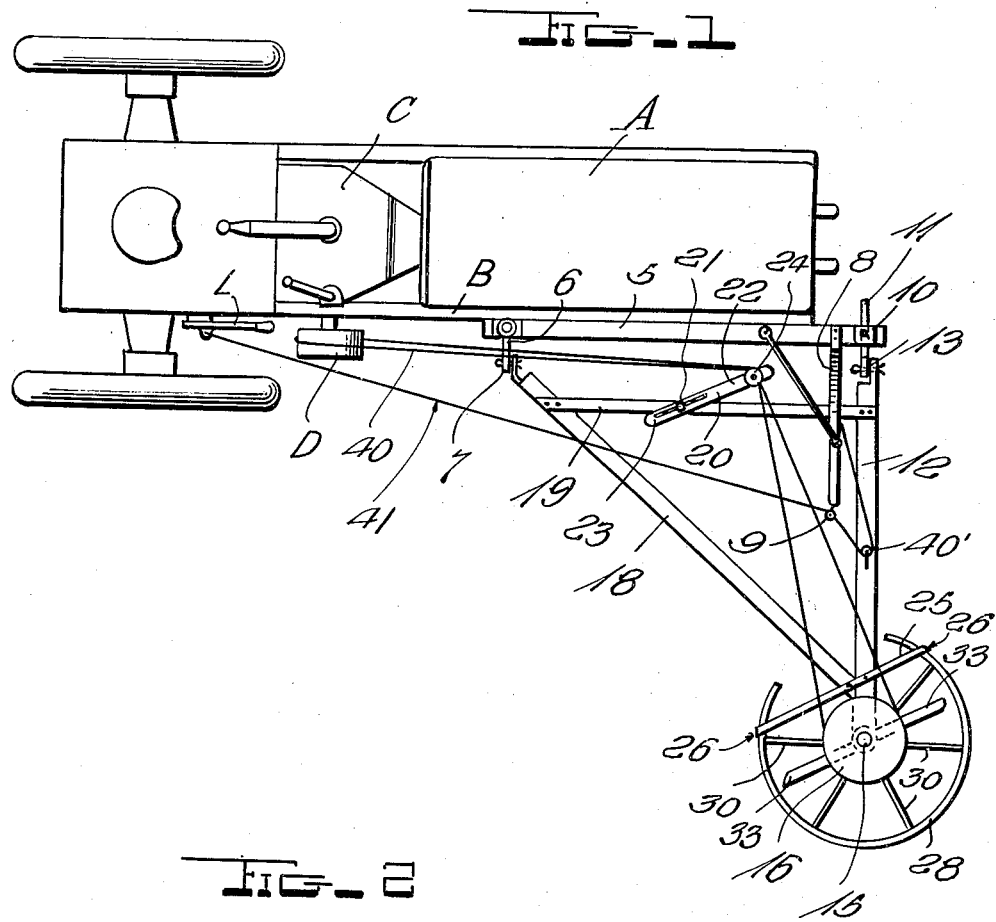
Fig. 1 is a plan view of a conventional tractor showing the rotary wheel cutter secured thereto.
Figure 2:
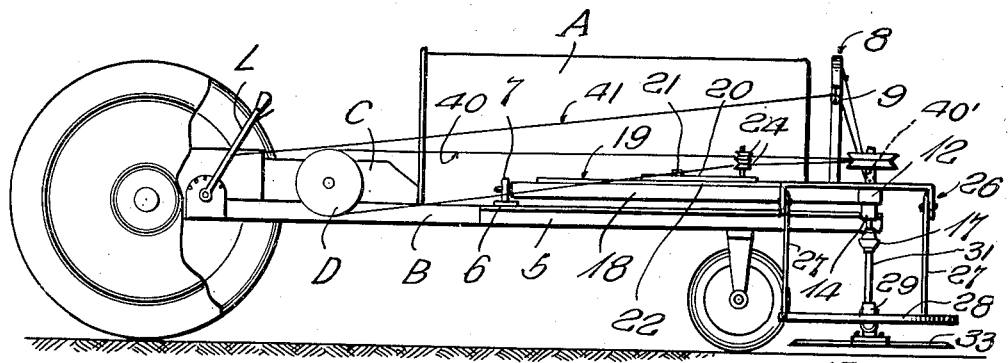
Fig. 2 is a side view thereof.

In the present illustration of this invention the letter A designates a conventional tractor which, among other well known elements, consists of a frame B, a power transmission unit C having a power take-off pulley D extending therefrom.

Rigidly secured to the tractor, preferably the right side thereof and extending forwardly of the same rigidly secured is a stationary beam 5 to the rear portion of which is an outwardly extending arm 6 having an upstanding apertured stud 7 formed thereon for a purpose to be hereinafter set forth while rigidly secured adjacent the forward end of said beam and extending upwardly and outwardly on an arcuate line is a standard 8 on the upper outer end of which is secured a pulley 9. Also formed on the forward end of said beam 5 is a bearing block 10 having a laterally extending smooth bore therethrough to adjustably accommodate a short beam 11 connected to a laterally extending beam 12 by a universal hinge joint 13.

Formed on the outer end of said beam 12 is an upper bearing sleeve 14 having its bore disposed on a perpendicular line to accommodate a stub-shaft 15 having a large pulley 16 splined to its upper end and a universal joint 17 secured to its lower end.

Loosely connected at its rear end to the upstanding stud 7 with its forward end secured to the outer end of the beam 12 is a brace beam 18 having its inner end connected to the inner end of said beam 12 by a cross beam 19 to retain said beams in fixed relation and also adjustable support a belt tightener 20 thereon as by a fastening element 21. Said belt tightner herein is illustrated in the form of a flat bar 22 having a longitudinally extending slot 23 in its outer portion to adjustably support small idle pulleys 24 thereon.

Rigidly secured at the outer end of said beam 12, preferably in diagonal relation thereto, is a horizontally disposed cross-bar 25 having downwardly extending apertured ears 26 to which is pivotally secured the upper ends of vertical bars 27 pivotally connected at their lower ends to a substantially semi-circular cutting blade guard and deflector 28 which is rigidly secured to a lower bearing sleeve 29 by spokes 30.

The lower bearing sleeve 29 is disposed in axial alignment with the upper bearing sleeve 14 and centrally of said guard to accommodate the lower portion of a vertical shaft 31 secured to the aforesaid universal joint at its upper end and having a head 22 formed on its lower end removably connected to a horizontally disposed cutting blade 33 by cap-screws 34 or the like.

Surrounding the aforesaid lower bearing sleeve is a substantially U-shaped yoke 35 secured at its outer ends to an elongated tubular control arm 36 which is connected at its upper end to beam 12 and braced by a bar 37 also connected to said beam. Said tubular control arm encloses an expansion coil spring 38 having its outer end bearing against a plunger 39 extending into the lower end of the control arm with its outer end yieldingly seated against said lower bearing sleeve to permit the shaft 31 to rock on the universal joint when the guard contacts an obstruction and return to its previously adjusted position relative to the ground and tractor after passing the same.

Power is transmitted from the power plant of the tractor to the shaft of the cutting blade by a suitable belt 40 trained over the large pulley 16, the idle pulley 24 and take-off pulley D of the tractor.

Secured to the beam 12 below and forward of the outer upper end of said standard 8 is a pulley 40' while secured to the tractor adjacent the seat thereof is a manually operated lever L which is connected to said beam by a cable 41 trained over pulleys 9 and 40' with its outer end secured to the standard 8 so the cutting blade can be manipulated at various angles relative to the ground and yet have freedom of movement when obstructions are encountered by the guard thereof.

With a rotary cutter constructed and assembled on a tractor as heretofore set forth, it is apparent that means are provided whereby close mowing around trees, fence posts and beneath wire and other forms of fences can be practiced and through co-action between the yieldable control arm and the swinging cutting blade shaft, damage to the blade by contacting stationary objects is entirely eliminated.

Having thus described our invention what we claim and desire to protect by Letters Patent is:

1. The combination with a tractor including power take-off means, an adjustable frame secured to the tractor, a stub-shaft journalled at the outer end of said frame, a universal joint secured to the lower end of the stub-shaft, an elongated shaft secured to the universal joint, a bearing sleeve on the lower portion of the shaft, a cutting blade removably secured to the lower end of the shaft in close proximity to the ground, a substantially semi-circular guard of greater diameter than the cutting blade surrounding the shaft at a point above the cutting blade, spokes securing the guard to the aforesaid bearing sleeve, a substantially inverted U-shaped cross-bar secured to the adjustable frame above said guard, arms pivotally connecting the guard to the cross-bar, power transmitting means connecting the aforesaid stub-shaft to the power take-off of the tractor, a control arm secured at its inner end to the adjustable frame with its outer end yieldingly bearing against said lower bearing sleeve, a brace bar connecting the control arm to the frame, a manually operated lever on the tractor adjacent the seat thereof, and means connected to said lever for raising and lowering said adjustable frame.

2. The combination with a tractor including a power take-off, an adjustable frame secured to one side of the tractor and extending laterally therefrom, a shaft swingably journalled to the outer end of the frame, a cutting blade secured to the lower end of said shaft, a guard of greater diameter than the blade surrounding the shaft, means pivotally supporting the guard from the frame, yielding means connecting the shaft to the frame and normally retaining it on a perpendicular line, power transmitting means connecting the shaft to the take-off, and means connected to the frame for raising and lowering it relative to the ground.

3. The combination with a tractor including a power take-off, a frame pivotally secured to the tractor, a shaft swingably journalled to said frame, a rotary cutting blade secured to the lower end of the shaft, means connected to the frame and yieldingly retaining the shaft in normal position on the frame, means connected to the frame for raising and lowering it relative to the ground, power transmitting means connecting the shaft to the take-off of the tractor, means carried by said shaft to deflect the cutting blade out of contact with stationary objects, and means pivotally supporting said shaft deflecting means on the frame.

4. The combination with a tractor including a take-off pulley, a beam secured to one side of the tractor frame, an outer extending arm secured to the rear end of the frame and having an upstanding outer end, a bearing block secured to the forward end of the beam, a short beam adjustably disposed in said bearing block and extending outwardly and laterally from the frame of the tractor, an elongated beam hingedly connected at its inner end to said short beam, a vertical bearing sleeve secured to the outer end of said elongated beam, a diagonal beam secured to the outer end of the elongated beam and having its rear end loosely connected to the upstanding end of the aforesaid arm, a stub-shaft journalled in the bearing on the outer end of said elongated beam, a universal joint secured to the lower end of the stub-shaft, a cross-bar connecting the diagonal and elongated beams adjacent their inner ends, a large pulley splined on the upper end of the stub-shaft, an adjustable belt tightener including pulleys secured to the cross-bar, a belt trained over the large pulley on the stub-shaft, pulleys on the belt tightener and take-off pulley of the tractor take-off, a cross-bar secured to the outer end of the elongated beam, downwardly extending ears formed on the ends of the cross-bar, a substantially semi-circular guard and deflector disposed below said elongated beam, an elongated vertical bearing sleeve centrally disposed of the guard, spokes securing the guard to said bearing sleeve, elongated bars pivotally connecting the guard to the ears of said cross-bar on the outer end of the elongated beam, an elongated shaft connected at its upper end to the universal joint and extending through said elongated bearing sleeve, a cutting blade removably secured to the lower end of the elongated shaft, an arcuate standard secured to the forward portion of that beam secured to the tractor frame and having its outer end disposed over the elongated beam connected thereto, a U-shaped yoke surrounding the lower bearing sleeve, a tubular brace secured at its lower end to the ends of the yoke with its upper end connected to the diagonal beam, a plunger extending from the lower end of the tubular brace with its outer end bearing against the lower bearing sleeve, an expansion coil spring within the tubular base and bearing against the inner end of the plunger, a brace bar connecting the outer end of the tubular brace to the cross-bar of the elongated diagonal beams, pulleys on said elongated beam and outer end of said arcuate standard, a manually operated lever disposed on the tractor, and a cable connected to said lever and trained over the latter mentioned pulleys with its outer end secured to the arcuate standard.

RALPH TURNER.
LLOYD HOWELL.

No references cited.